US008765237B2

(12) United States Patent
Boodaghians et al.

(10) Patent No.: US 8,765,237 B2
(45) Date of Patent: Jul. 1, 2014

(54) TRASH COMPACTOR CARTON WITH ANTIMICROBIAL PROPERTIES

(71) Applicant: MAG Aerospace Industries, Carson, CA (US)

(72) Inventors: Razmik B. Boodaghians, Glendale, CA (US); Tim Birbeck, Torrance, CA (US)

(73) Assignee: MAG Aerospace Industries, Inc, Carson, CA (US)

( * ) Notice: Subject to any disclaimer, the term of this patent is extended or adjusted under 35 U.S.C. 154(b) by 0 days.

(21) Appl. No.: 13/671,715

(22) Filed: Nov. 8, 2012

(65) Prior Publication Data

US 2013/0115389 A1 May 9, 2013

Related U.S. Application Data

(60) Provisional application No. 61/556,896, filed on Nov. 8, 2011.

(51) Int. Cl.
*B29D 22/00* (2006.01)

(52) U.S. Cl.
USPC .. 428/34.2; 493/59; 229/117.01; 229/117.09; 229/125

(58) Field of Classification Search
USPC ........... 428/34.1, 34.2; 229/117.01, 122, 124, 229/125, 155, 171, 907; 493/59
See application file for complete search history.

(56) References Cited

U.S. PATENT DOCUMENTS

| | | | | |
|---|---|---|---|---|
| 1,985,698 | A | 12/1934 | Swan | |
| 4,559,103 | A * | 12/1985 | Nomura et al. | 162/160 |
| 4,620,479 | A * | 11/1986 | Diamond et al. | 100/215 |
| 4,711,390 | A * | 12/1987 | Andrews et al. | 229/117.06 |
| 4,809,390 | A * | 3/1989 | Jackson et al. | 15/257.9 |
| 2004/0033343 | A1 | 2/2004 | Comeau | |
| 2013/0026215 | A1 * | 1/2013 | Lenhard et al. | 229/117.01 |
| 2013/0115389 | A1 * | 5/2013 | Boodaghians et al. | 428/34.1 |

FOREIGN PATENT DOCUMENTS

| | | | |
|---|---|---|---|
| EP | 0987184 | A2 | 3/2000 |
| EP | 2199046 | | 6/2010 |
| WO | 2007044398 | A2 | 4/2007 |

OTHER PUBLICATIONS

International Search Report and Written Opinion dated Jan. 28, 2013 in Application No. PCT/US2012/064056.

* cited by examiner

*Primary Examiner* — N. Edwards
(74) *Attorney, Agent, or Firm* — Kristin M. Crall; Dean W. Russell; Kilpatrick Townsend & Stockton LLP

(57) ABSTRACT

Embodiments of the invention relate to trash compactor boxes that have an antibacterial or antimicrobial feature incorporated therein. In a general embodiment, the carton boxes have a built-in compound, such as an antimicrobial, antiseptic, and/or a biocide material.

4 Claims, 4 Drawing Sheets

TRASH COMPACTOR CARTON WITH ANTIMICROBIAL PROPERTIES

CROSS REFERENCE TO RELATED APPLICATIONS

This application claims the benefit of U.S. Provisional Application Ser. No. 61/556,896, filed Nov. 8, 2011, titled "Trash Compactor Carton with Antimicrobial Properties," the entire contents of which are hereby incorporated by reference.

FIELD OF THE INVENTION

Embodiments of the present invention relate generally to trash compactor cartons and boxes having antimicrobial properties.

BACKGROUND

Trash compactors are used to handle all types of waste materials, such as spent food and drinks and other organic materials, disposable cutlery, paper, plastic, glass or metal items, such as cans and bottles, and so forth. Collecting and disposing of trash in confined conditions, particularly on-board passenger transport vehicles, such as aircraft, trains, ships, buses, RVs, and other land, water, air, or other passenger transport travel vessels can be challenging. However, a good deal of rubbish is generated on such vehicles. For example, after in-flight beverage service, unused items are collected, which often includes left-over portions of meals and drinks (such as coffee, tea, soft drinks, and cocktails), drink cups, napkins, newspapers, food wrappers, tea bags, beverage cans, other packaging or non-consumable items and the like, food wastes (and in particular, food wastes that are organic in nature such as fruit, fruit skin, and bones), coffee grounds and tea bags, semi-liquid materials such as water-based mixtures, alcohol, fats and oils, or any other type of disposable item that a passenger may consume or bring on-board.

Non-consumable items are also collected inside the trash compactor, which include beverage cartons, cans, and bottles, disposable cutlery, napkins, newspapers and magazines, and so forth. These vehicles thus have equipment on-board for compacting waste, thereby reducing the space and volume required for the storage of various waste materials.

Trash compactors are also used for residential and commercial uses, for example, in homes, restaurants, and any other locations where waste is generated and space is at a premium. Embodiments of the invention will be described throughout the remainder of this document for use in connection with passenger transport vehicles, but it should be understood that uses in other locations and for other purposes are possible as well, and are to be considered within the scope of the invention.

SUMMARY

Embodiments of the invention relate to trash compactor boxes that have an antibacterial or antimicrobial feature incorporated therein. In a general embodiment, the carton boxes have a built-in compound, such as an antimicrobial, antiseptic, and/or a biocide material.

BRIEF DESCRIPTION OF THE FIGURES

Aircraft trash compactors typically include a chamber with a front door in order to receive a carton box, as shown in FIG. 1.

The trash compactor also houses a hydraulic press arrangement to compact the waste, which is compacted inside the carton box, as shown in FIG. 2.

Figure 3:
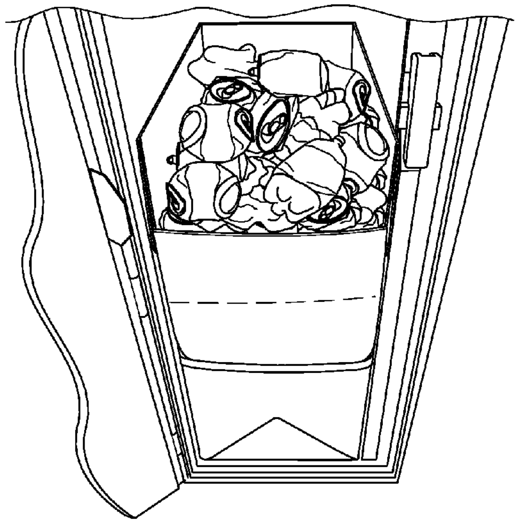

The carton box is sealed and replaced once full, as shown in FIG. 3.

Figure 4:
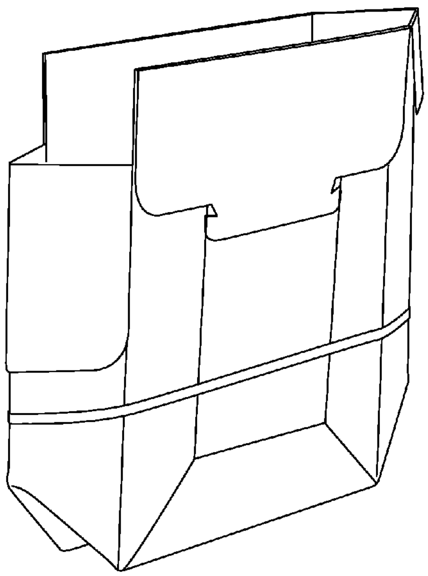
Figure 5:
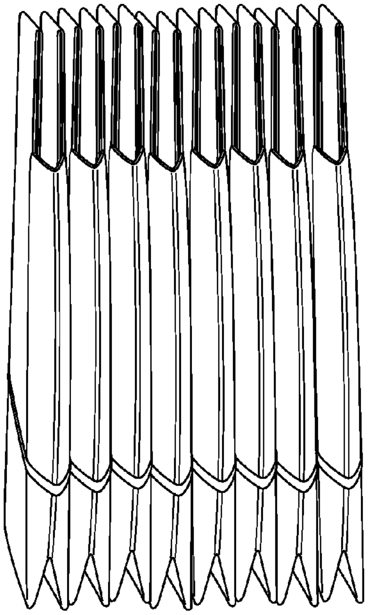

FIGS. 4 and 5 show an example of one type of carton box that is often used on-board aircraft in connection with trash compactors.

Figure 6:
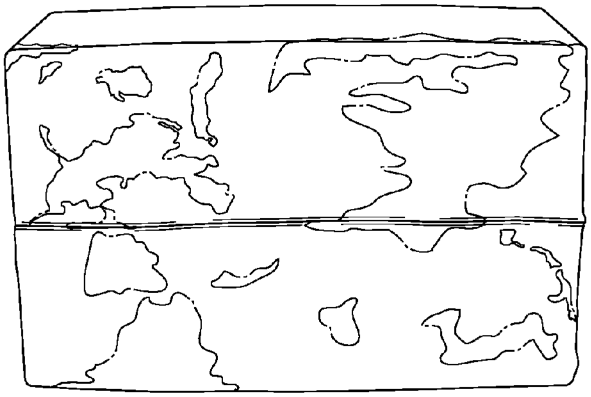
Figure 7:
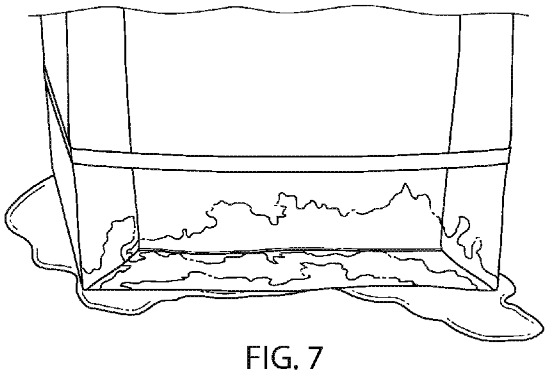

FIGS. 6 and 7 shows examples of leakage on a carton.

Figure 8:
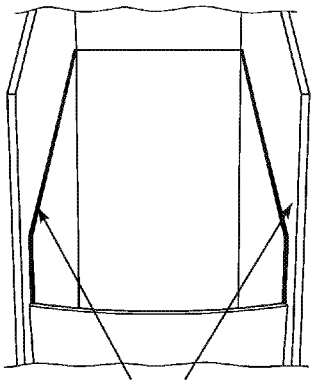
Figure 9:

FIG. 8 shows arrows pointing to areas where the formation of mold bacterial colonies is most prevalent FIG. 9 shows an *E. coli* forming unit (Cfu) assay on a membrane filter using mFC medium. The *E. coli* colonies are the dark spots.

DETAILED DESCRIPTION

Figure 1:
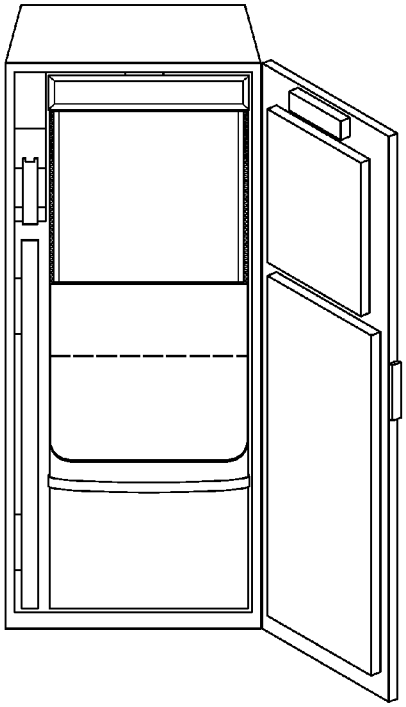
Figure 2:
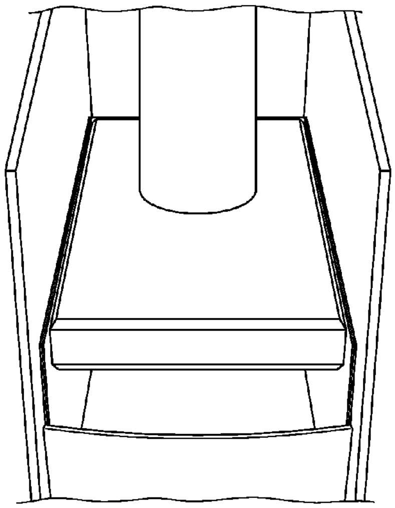

Carton boxes for use on-board aircraft in connection with trash compactors are generally either a three-layer box or a corrugated box. Certain boxes have at least an inner layer that is generally waterproof or water resistant to prevent leaching of liquid or semi-liquid substances from the interior of the box out to the metal interior of the trash compactor itself. The boxes are generally positioned inside a trash compactor, as shown in FIG. 1. In use, once the box is full, a hydraulic press with a platen is moved to compress trash inside the carton in order to compact the trash to smaller size. An example of this step in process is shown in FIG. 2, and the compressed trash in a box is shown in FIG. 3.

Examples of traditional trash compactor carton boxes are shown in FIGS. 4 and 5. Although these boxes may be treated to waterproofed, nonetheless, there are often instances when the trash either sits in the compactor for too long, is not removed timely, or leakage occurs at a faster rate than expected (examples are shown in FIGS. 6 and 7), all of which can cause mold growth inside the compartment, often at the areas marked in FIG. 8. The presence of mold spores may present a health hazard to humans, potentially causing allergic reactions. Poor housekeeping of the equipment during service, contact with spent food, and the inevitable fact that trash compactors are typically used in dark areas with little to no light exposure, further encourages mold and/or bacteria colony formation and growth, examples of which are shown in FIG. 9. There are varieties of such species with different potential health hazards. There is thus needed a way to impart trash compactor cartons or boxes with antimicrobial properties.

The present inventors have thus determined that it would be beneficial to impart an antibacterial or antimicrobial feature to trash compactor cartons or boxes. In a general embodiment, the carton boxes have a built-in compound, such as an antimicrobial, antiseptic, and/or a biocide material. The term "antimicrobial" is used herein to encompass, but not be limited to, all potential compounds that kill or inhibit the growth of bacteria, fungus, mold, mildew, parasites, microorganisms, viruses, and any other unwanted species that may grow in a waste carton. The term is intended to encompass, but not be limited to, any types of antimicrobials, antiseptics, disinfectants, biocides, sterilizers, deodorizers, decontaminants, purifiers, or any other substances that can freshen, clean, deodorize, inhibit odors, and/or prevent or inhibit unwanted growth of any of the above-described species. Potential examples of such chemicals are manufactured and sold by Total Science Antiseptic Solutions, a company based in France. However, it should be understood that a number of chemical companies (such as Dow Chemical, BASF, DuPont, Microban, and/or Eastman Chemical), manufacture chemicals that may be used with the embodiments described.

The cartons may be impregnated with, incorporated with, sprayed, coated, painted, or otherwise associated or provided with an antimicrobial chemical or compound in order to prevent the formation and migration of these species to the permanent structure of the equipment. Any vehicle of introducing the compound into the substrate that forms the box is possible, and specific, non-limiting examples are described herein.

The application or incorporation of the selected compound to or into the carton box should generally not hinder the performance of the box. It does, however, improve the overall hygiene of the equipment, plus it safeguards against any potential human contact problems during servicing and maintenance operations. It is preferable that the compound not leach or migrate out of the box in use (e.g., when the box is exposed to moisture), and thus, the most appropriate methods of maintaining the compound in association with the box are preferred.

In one embodiment, the box may be penetrated with an appropriate antimicrobial compound. For example, the box may be formed (in whole or in part) and then soaked (in whole or part) or otherwise engulfed or submerged in the compound. In this embodiment, it is likely that the compound will be in a liquid or gas form.

In another embodiment, the compound is combined with the material used to form the box. For example, the material may be in solid, liquid, or gas form and incorporated into the box itself. For example, the compound may be added to the raw carton components prior to formation of the box itself. The compound may be powder-like particles, a liquid solution, or a gas, and of which may be added, poured or is injected into or mixed with the cardboard precursors.

In a further embodiment, the compound is applied to an outer surface or one of the layers of the carton. For example, it may be sprayed, painted, doctor bladed, coated or otherwise applied to a surface or a layer of the carton. The compound may be applied to any of the layers or any compartments of the carton. For example, in the 3-layer option, one, two or all three of the layers may be treated. In the corrugated box option, any one or more of the inner, the outer, or the corrugated portion may be treated. In a specific embodiment, the inner-most layer of the carton is treated, which is the layer that is in most close contact with waste. In another embodiment, the outer-most layer of the carton is treated, which is the layer that is in most close contact with the interior of the trash compactor. In another embodiment, the middle layer(s) is/are treated. Any one or all of the above combinations may be used. The compound may be applied to most, if not all of the carton, such that the carton is encapsulated with the compound. Additionally or alternatively, the component may be applied to only a portion of the carton.

Whichever method is selected, it is possible that a preventive barrier may be also applied over the box in order to maintain the integrity of the compound during use.

Regarding the compound itself, any appropriate antiseptic (liquid, solid, gas/vapor spray) and/or biocide or biocidal compound (synthetic and/or naturally occurring) and/or antimicrobial compound may be used. Additionally or alternatively, elements such as silver, copper, copper alloys or combinations thereof that have antimicrobial properties may also be used. The primary goal is that the compound selected should impart one or more of the following properties to the carton:

prevent and/or reduce the formation of unpleasant odor, which often becomes stronger with time, as the equipment continuously handles food waste;

prevent and/or reduce the formation of undesired species in and around the trash carton;

the built-in anti-microbial component helps to make the carton box (as well as the trash compactor) operation and maintenance cleaner, fresher and longer lasting.

Changes and modifications, additions and deletions may be made to the structures and methods recited above and shown in the drawings without departing from the scope or spirit of the invention and the following claims.

What is claimed is:

1. A trash compactor carton comprising:

a structural body comprising an interior that can contain trash and sides that can withstand compaction forces from a trash compactor when trash is compacted in the carton, the structural body comprising a three-layer corrugated box with an inner layer that faces trash contained in the carton, wherein the inner layer comprises a water-resistant inner layer that is sprayed with an antimicrobial material.

2. The trash compactor carton of claim 1, further comprising antimicrobial material sprayed onto an outer surface of the structural body.

3. The trash compactor carton of claim 1, wherein the carton is comprises of a porous material and wherein spraying of the antimicrobial material allows the antimicrobial material to penetrate into the porous material without damaging the structural body upon compaction.

4. The trash compactor carton of claim 1, wherein the antimicrobial material comprises an antimicrobial, an antiseptic, a disinfectant, a biocide, a sterilizer, a deodorizer, a decontaminant, a purifier, or a substance that can freshen, clean, deodorize, inhibit odors, or prevent or inhibit unwanted growth of bacteria, fungus, mold, mildew, parasites, microorganisms, or viruses.

* * * * *